United States Patent [19]
Bopp et al.

[11] 3,756,028
[45] Sept. 4, 1973

[54] HYDROKINETIC COUPLING

[75] Inventors: Warren G. Bopp, Farmington;
William S. Nagel, Cincinnati, both of Ohio

[73] Assignee: Eaton Corporation, Cleveland, Ohio

[22] Filed: Apr. 19, 1972

[21] Appl. No.: 245,417

[52] U.S. Cl............................ 60/353, 60/366, 60/337
[51] Int. Cl.............................................. F16h 41/04
[58] Field of Search...................... 60/330, 342, 347, 60/353, 364, 366

[56] References Cited
UNITED STATES PATENTS
2,088,818  8/1937  Skinner................................. 60/357
3,572,480  3/1971  Nagel.................................. 60/353 X FOREIGN PATENTS OR APPLICATIONS
465,856  2/1914  France.................................. 60/364

Primary Examiner—Edgar W. Geoghegan
Attorney—Paul S. Rulon

[57] ABSTRACT

A hydrokinetic coupling of the toroidal fluid flow type having an impeller member and a turbine member. The impeller member has a radially inwardly facing trough positioned radially outward of the turbine member which has a radially outwardly facing trough. The troughs together form a toroid of substantially elliptical cross section. A plurality of mutually facing stepped blades circumferentially disposed in the impeller and turbine member troughs define a stepped annular gap between the members. The gap is generally Z-shaped and includes two gap portions parallel to the rotational axis of the members radially offset by a third gap portion transverse to the rotational axis. An annular core guide ring is disposed in the transverse gap portion and secured to the impeller blades; this ring cooperates with a cylindrical sleeve, which is selectively movable into one of the offset gaps, to control fluid circulation between the impeller and the turbine.

18 Claims, 4 Drawing Figures

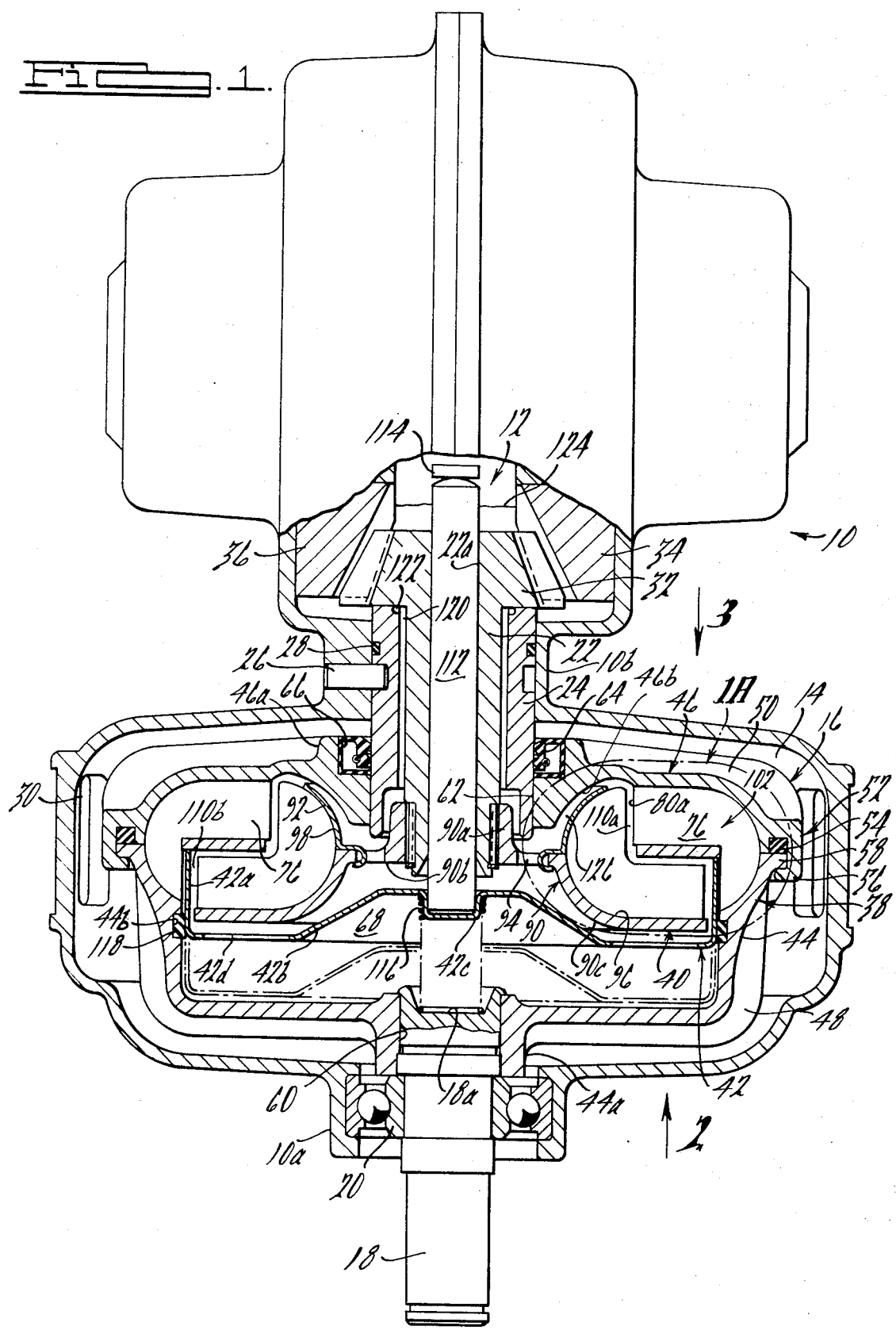

HYDROKINETIC COUPLING

BACKGROUND OF THE INVENTION

1. Field of the Invention

This invention relates generally to hydrokinetic devices and specifically to torque control of such devices.

2. Description of the Prior Art

Hydrokinetic devices have long been used to transmit or dissipate kinetic energy. The most popular of these devices involve a design wherein axially facing, annular trough members of semicircular cross section together form a toroid having radially disposed impeller blades in one member and radially disposed turbine or stator blades in the other member. The selection of turbine or stator blades depends on whether the device is used to transmit or dissipate energy. Toroidal fluid flow in devices of this design is easily established since the difference in radius within the impeller creates an unbalanced centrifugal force on the fluid in the impeller and hence a radially outward fluid flow which is vectored into the turbine by the curvature of the impeller trough and blades. However, regulation of torque in a device of this design has not been easily implemented. One regulation method involves controlling the amount of fluid fill in the toroid. However, the time required to fill or drain the toroid makes this regulation method unacceptable in applications requiring fast control response. A second method of regulation involves insertion of sluice gates in the radially extending gap between the impeller and turbine. This method is unwieldly at best and cost prohibitive for many applications. A third method of regulation involves providing an annular slot in one of the members into which a cylindrical sleeve is inserted to throttle fluid circulation in the toroid. This method is not completely effective in throttling fluid circulation because undesirable eddy currents are established in the areas radially outward and inward of the sleeve. A fourth regulation method combines the draining concept of method one and the sleeve concept of method three. With this combination the sleeve provides fast torque control at high energy transmitting levels and draining provides a more complete torque control at low energy transmitting levels. However, this combination is complicated and costly and has a slow response characteristic when going from low torque transmitting demands to high demands.

A second hydrokinetic device, such as the one shown in U.S. Pat. No. 3,537,264, has a toroid defined by a radially inwardly opening trough and a radially outwardly opening trough. The troughs are semicircular in cross section, have radially disposed blades therein, and are spaced apart in a manner defining an annular gap therebetween. The device of this basic design has been used as a retarder by fixing the inwardly opening trough for nonrotation and rotating the outwardly opening trough. When used as a retarder in this manner excellent torque regulation is provided by inserting a cylindrical sleeve into the gap between the troughs. However, there is some evidence to indicate that use of this basic design as a coupling would not be entirely satisfactory in some applications. For example, in one test of this design using the inwardly opening trough as the impeller, satisfactory toroidal fluid flow could not be established. In a second test using the outwardly facing trough as the impeller, toroidal fluid flow was established but flow decreased rapidly with increasing speed of the inwardly opening trough and diminished to unacceptable levels at approximately seventy percent speed difference between the troughs.

SUMMARY

An object of this invention is to provide a hydrokinetic device having improved energy transmitting or dissipating characteristics.

Another object of this invention is to provide a compact and low cost hydrokinetic device.

A more specific object is to provide a hydrokinetic device having the superior energy transmitting and/or dissipating characteristics of the axially facing trough design in combination with the superior torque regulating characteristics available in the radially facing trough design.

The hydrokinetic coupling of the invention achieves these objects by uniquely combining design features of the axially facing coupling and the radially facing coupling. Specifically, and according to an important feature of the invention, the impeller and turbine troughs are radially facing but the blades carried in the troughs have stepped edges which are complementary and which together define a stepped annular gap between the impeller and turbine blades.

According to a further feature of the invention, the annular gap between the impeller and turbine blades is generally Z-shaped and includes two portions parallel to the rotational axis of the device radially offset by a third portion transverse to the axis.

According to another feature of the invention, a cylindrical sleeve is arranged to move axially into one of the axially parallel portions of the Z-shaped gap to selectively throttle the toroidal fluid flow within the coupling, and a core guide ring is positioned in the transverse portion of the Z-shaped gap to provide a seat against which the free edge of the cylindrical sleeve can sealingly coact to block all fluid flow within the coupling.

These and other objects and features of the invention will be apparent from the detailed description of the preferred embodiment.

BRIEF DESCRIPTION OF DRAWING

A preferred embodiment of the invention is shown in the accompanying drawings in which:

FIG. 1 is a fragmentary view of a transmission embodying a hydrokinetic coupling according to the invention;

DESCRIPTION OF THE PREFERRED EMBODIMENT

Figure 1A:
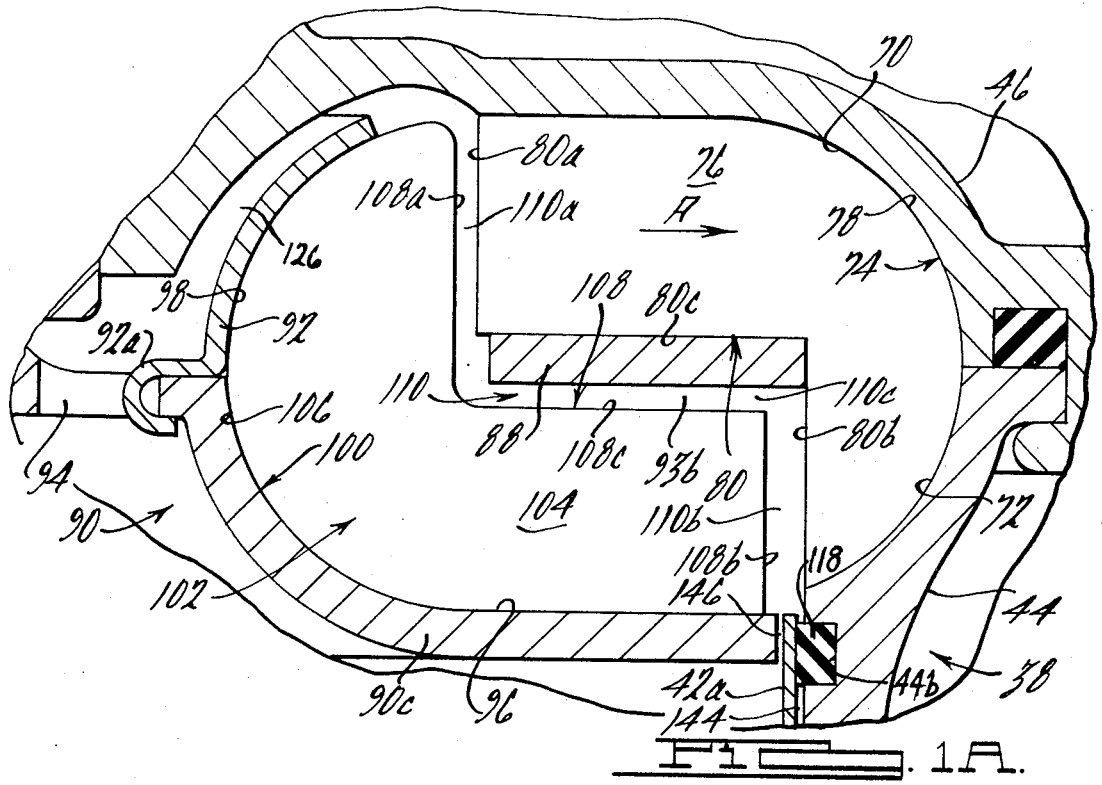
FIG. 1A is an enlarged view of the portion of the hydrokinetic coupling of FIG. 1 seen within the elliptical dash and dot outline 1A of FIG. 1.

Referring first to FIG. 1, the transmission seen in FIG. 1 includes a transmission housing 10 of somewhat hourglass shape defining a gear chamber 12, shown in partial section, and a hydrokinetic coupling chamber 14, shown in full section. A hydrokinetic coupling 16 is mounted for rotation within chamber 14.

Coupling 16 includes an input shaft 18 journaled in a ball bearing 20 mounted in a hub portion 10a of housing 10, and an output shaft 22 journaled in a sleeve bearing 24 positioned within neck portion 10b of housing 10. Sleeve bearing 24 is secured by a pin 26 and sealed about its periphery by an O-ring 28. A plurality of openings 30 circumferentially spaced around the periphery of chamber 14 allow circulation of cooling air into and out of the chamber. A bevel gear 32 fixed to and driven by output shaft 22 is in constant mesh with a pair of load driving gears 34, 36 which may be engaged or disengaged with a load (not shown). The gearing contained in chamber 12, which is only partially shown, may be of any conventional type and is mentioned here merely as an example of a means for connecting the coupling output to a load.

The coupling 16 comprises an impeller member 38, a turbine member 40, and a cylindrical control sleeve 42.

Impeller 38 comprises a lower cup-shaped member 44 and a lid member 46. The exterior surfaces of members 44, 46 have formed thereon a plurality of cooling fins 48, 50 for dissipating heat produced by coupling 16. Members 44 and 46 are joined and sealed circumferentially at 52. Joining and sealing may be accomplished in any of several well known ways; herein sealing is provided by an O-ring seal 54 and joining by rolling an edge 56 of member 46 over a lip 58 of member 44. Members 44, 46 when joined rotate as a single unit in response to rotation of input shaft 18 which is press-fitted into an aperture 60 in a hub portion 44a of impeller 38. Ball bearing 20, in addition to providing the lower journal for impeller 38 also provides vertical support for the impeller. Journaling of the lid member 46 of the impeller is provided by an aperture 62 in a hub portion 46a of member 46 which receives a downward projection of sleeve bearing 24. A seal 64, press-fitted into a counter bore 66 in hub portion 46a, provides a fluid seal between a fluid chamber 68, defined within impeller 38, and coupling chamber 14.

Looking now at FIG. 1A and the interior of impeller member 38, a pair of smooth, curved surfaces 70, 72 formed respectively on the interior walls of housing members 46, 44 coact to define a radially inwardly facing trough 74. A plurality of fluid directing impeller blades 76, having curved outer edges 78 and stepped inner edges 80, are circumferentially spaced in trough 74 (see FIG. 2). Blades 76 may be integrally formed with member 46, such as by casting, or attached in any of several well known manners. The portion of curved edge 78 lying adjacent to surface 72 fits snugly thereagainst and is preferably unattached to simplify assembly. The stepped edges 80 are each formed by two edge portions 80a, 80b which are parallel to the axis of shaft 18 and separated by a third edge portion 80c which is perpendicular to edges 80a, 80b. An annular core guide ring 88 is snugly fixed to the edges 80c of blades 76.

Referring again to FIG. 1, the turbine member 40 includes a turbine wheel 90 and a shroud 92. Wheel 90 includes a splined hub portion 90a press-fitted on the lower end of shaft 22, a radially outwardly extending flange portion 90b having a plurality of circumferentially spaced holes 94 therein, and a further radially outwardly extending portion 90c. Referring now to FIG. 1A, outwardly extending portion 90c has a smooth, curved surface 96 facing surface 70 and of substantially the same cross-sectional shape. Shroud 92 has a smooth curved surface 98 facing surface 72 and of substantially the same cross-sectional shape. Shroud 92 has a plurality of downwardly projecting tabs 92a which pass through holes 94. Shroud 92 is secured to turbine wheel 90 by bending the tabs as shown. Curved surfaces 96, 98 together define a radially outwardly facing trough 100 which, together with impeller trough 74, defines a toroidal fluid working chamber 102 having a substantially elliptical cross-sectional shape. A plurality of fluid directing turbine blades 104 are circumferentially spaced in trough 100 (see FIG. 3). Blades 104 have curved edges 106, which coincide with the cross-sectional shape of trough 100, and stepped edges 108 facing the stepped edges 80 of blades 76 and defining therebetween an annular stepped gap 110. Blades 104 may be integrally formed with turbine wheel 90, such as be casting, or attached in any of several well known manners. The portion of curved edges 106 lying adjacent to surface 98 fits snugly thereagainst. The stepped edges 108, like stepped edges 80, are formed by two edge portions 108a, 108b which are parallel to the axis of shaft 22 and separated by a third edge portion 108c which is perpendicular to edges 108a, 108b. Edges 80a, 108a are mutually facing and spaced apart to provide a running annular clearance gap 110a therebetween comprising a parallel portion of stepped gap 110. Edges 80c, 108c are mutually facing and spaced apart to provide an annular gap 110c comprising a perpendicular portion of stepped gap 110; gap portion 110c is large enough to allow running clearance between edges 108c and core guide ring 88. Edges 80b, 108b are also mutually facing and spaced apart to provide an annular gap 110b comprising a parallel portion of stepped gap 110; gap portion 110b is large enough to allow insertion of cylindrical control sleeve 42 shown in FIG. 1.

Referring again to FIG. 1, cylindrical control sleeve 42 includes a sleeve portion 42a and a flange portion 42b. Sleeve portion 42a has an inner diameter which is slightly greater than the innermost diameter of annular gap portion 110b and an outer diameter which is slightly less than the outermost diameter of gap portion 110b. Flange portion 42b includes a central hub portion 42c which is fitted over the lower end of a control shaft 112 slidably positioned in a central bore 22a in output shaft 22. Shaft 22 thus supports sleeve portion 42a in a position of axial alignment with gap portion 110b. Circulation of reservoir fluid between the area above and below flange portion 42b is provided by a plurality of circumferentially arrayed openings 42d in the outer peripheral portion of flange 42b. A positionable control arm 114, shown in end view only and in its uppermost position, is located at the other end of shaft 112. When arm 114 is as shown, sleeve portion 42a is fully inserted into gap 110b and seated against core guide ring 88 by the biasing force of a coil spring 116 fitted at its upper end over hub portion 42c and received at its lower end in central recess 18a in the upper end of shaft 18. Sleeve portion 42a may be fully withdrawn from gap portion 110b, as represented by the broken line position of FIG. 1 and the solid line position of FIG. 1A, or intermediately positioned within gap 110b by selectively positioning arm 114. The arm may be controlled in any of several well known ways; herein the arm is fixed to a shaft, not shown, which is manually rotated by an operator. A split ring seal 118 of rectangular cross section is fitted in an annular groove 44b in member 44; seal 118 seals the area between sleeve portion 42a and the wall of member 44.

A plurality of interconnecting pairs of channels 120, 122 formed respectively in the inner periphery and top end of sleeve bearing 24 allow fluid communication between fluid chamber 68 and gear chamber 12. Channels 122 extend tangentially outwardly from the inner diameter of sleeve bearing 24. Chamber 68 and the lower portion of gear chamber 12 together form a fluid reservoir, which is filled to the level indicated by line 124, with a low viscosity oil such as automatic transmission fluid. A fluid inlet passage 126 defined between shroud 92 and an adjacent interior wall portion 46b of member 46 supplies fluid to working chamber 102 from the fluid reservoir; the reservoir fluid enters the working chamber 102 adjacent gap portion 110a. The construction of impeller blades 76 is such that rotation of the impeller accelerates fluid in the working chamber 102 radially outward from the edge portions 80a. Gap portion 110a adjacent edges 80a constitutes a fluid inlet for the impeller, both for toroidally circulating fluid within the working chamber and for makeup fluid entering through passage 126 to replace fluid leakage occurring at gap portion 110b. Hence, the area adjacent edges 80a is a low pressure area which provides suction to draw makeup fluid through inlet passage 126 and into the working chamber 102. The described reservoir and makeup fluid arrangement provides total immersion of the turbine and impeller members in oil, prevents air from being sucked downward along the inner and outer diameters of shaft 22 by the suction from passage 126, provides room for fluid expansion, and provides lubrication for sleeve bearing 24 and the gears in chamber 12.

Referring now to FIGS. 1A–3, impeller 38 includes pockets 128 defined between adjacent impeller blades 76 and the adjacent portion of trough 74. When the impeller member is rotated impeller blades 76 impart an energy velocity to the fluid in pockets 128, thereby establishing a radially outward fluid flow. The smooth, curved surface of trough 74 guides the flow and changes its direction to a radially inward flow which exits the impeller at edge portion 80b, passes through gap portion 110b, and enters the turbine at edge portion 108b with minimum energy velocity losses. The fluid upon being directed into the turbine enters pockets 130 defined between adjacent turbine blades 104 and the adjacent portion of trough 100. The fluid flowing through the turbine gives up energy velocity and imparts a torque to the turbine while being guided by the smooth, curved surface of trough 100. Trough 100 changes the radially inward flow to a radially outward flow which exits the turbine at edge portion 108a, passes through gap portion 110a, and reenters the impeller at edge portion 80a.

Figure 2:
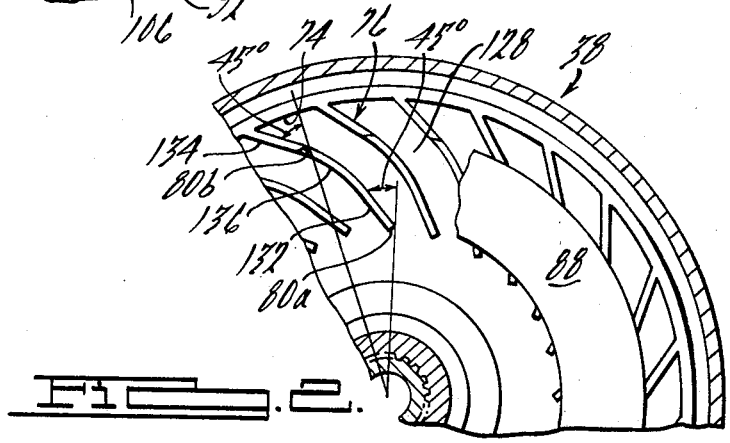
FIG. 2 is a reduced, fragmentary view of the impeller of the coupling shown in FIG. 1, looking in the direction of the arrow 2 in FIG. 1.

Referring now to the bottom view of the impeller member 38 in FIG. 2, the core guide ring 88 is shown partially broken away to illustrate the impeller blade construction. Each impeller blade 76 has a straight portion 132 beginning at blade edge 80a, portion 132 makes a 45° angle with a radius line drawn to edge 80a. A second straight portion 134 begins at blade edge 80b and extends to the outer circumferential surface of trough surface 74; portion 134 also makes a 45° angle with a second radius line drawn to edge 80b. The straight blade portions 132, 134 are joined by a smooth, curved blade portion 136 which functions to minimize turbulence of the fluid flowing over the blade from the inlet to the outlet.

Figure 3:
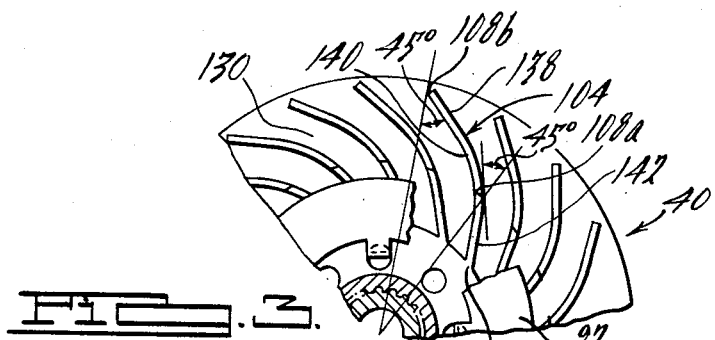
FIG. 3 is a reduced, fragmentary view of the turbine of the coupling shown in FIG. 1, looking in the direction of the arrow 3 in FIG. 1.

Referring now to the top view of the turbine member 40 in FIG. 3, shroud 92 is partially broken away to reveal the turbine blade construction. The construction of turbine blades 104 is similar to the described construction of impeller blades 76. Each turbine blade 104 has a straight portion 138, beginning at blade edge portion 108b; blade portion 138 makes a 45° angle to a radius line drawn to edge 108b. Straight edge portion 138 transitions into a curved portion 140 and then back to a straight portion 142 at a point about midway between blade edge portion 108a and the radially innermost extent of curved edge 106. A tangent line drawn to curved portion 140 at edge portion 108a makes a 45° angle with a radius line drawn to edge portion 108a.

The above impeller and turbine construction allows a coplanar relationship between the impeller and turbine blades exits and entrances as the impeller blades pass the turbine blades. This allows fluid to flow smoothly from the impeller to the turbine, or vice versa, with a minimum of turbulence. The torque transmitting capacity of a fluid coupling increases with mass circulatory velocity of the fluid within the toroidal circuit and mass circulatory velocity is decreased by turbulence in the toroidal circuit. The described coplanar relationship between the impeller and turbine blade exits and entrances therefore contributes importantly to the torque transmitting capacity of the coupling.

When control sleeve 42a is withdrawn from gap 110b by moving control arm 114 downward, rotation of impeller member 38 creates a circulatory movement of fluid in impeller pockets 128 in the radially outward direction indicated by arrow A in FIG. 1A. Circulation is always in this direction and is due to the difference in radius between the inlets and outlets of impeller blades 76.

OPERATION

The coupling embodied in the transmission of FIG. 1 is designed for serial connection between a prime mover, such as a piston or turbine engine, and a load. The connection to the load may be through a gear mechanism, as shown, or may be direct. The coupling input shaft 18 may be directly connected to a prime mover output shaft or may be driven thereby through a fixed or variable ratio drive arrangement.

With control sleeve portion 42a withdrawn from gap 110b, rotation of impeller member 38 causes impeller blades 76 to impart a centrifugal force on the fluid in pockets 128 due to the difference in radius between the inlet and outlet edges of the impeller blades. This force establishes a toroidal fluid circulation in working chamber 102 in the direction of the arrow A in FIG. 1A. The curvature of trough 74 smoothly redirects the radially outward flow to a radially inward flow which is substantially perpendicular to the gap portion 110b as the fluid flows into the turbine member 40. The fluid flowing through the turbine imparts a torque thereto while being redirected to a radially outward flow which circulates back to the impeller. Continued rotation of the impeller reaccelerates the fluid to maintain a toroidal fluid flow within the working chamber 102.

In general, torque transmission through a hydrokinetic coupling increases with increasing mass circulator flow in the fluid working chamber, reaching a maximum for any given size coupling and impeller speed when the turbine is stalled. Conversely, increasing turbine speed results in decreasing mass circulatory flow in the fluid working chamber and increases coupling efficiency. Hence, to vary the torque transmission through a coupling for a given turbine load, the mass circulartory flow in the fluid working chamber must be varied. This can be accomplished by varying the impeller speed.

Control sleeve portion 42a provides a means for controlling the torque transmitting capacity of coupling 16 by throttling the mass circulatory flow in working chamber 102 independent of turbine load and impeller speed. Tests of coupling 16 have shown a substantially linear correlation between the percentage insertion of sleeve portion 42a into gap portion 110b and the percentage torque reduction of the coupling, i.e., 50 percent insertion produces a torque reduction of about 50 percent and 100 percent insertion produces a reduction of slightly less than 100 percent. At 100 percent insertion, small torque are transmitted to shaft 22 of the turbine member. However, these small torques are very low and within a range which indicates they are due to viscous drag. This very low torque transmission through coupling 16 is achieved by totally blocking direct and indirect fluid flow between impeller member 38 and turbine member 40. Direct fluid flow between the impeller and turbine members at 100 percent sleeve insertion is prevented by the sealing coaction between the free end of sleeve portion 42a and core guide ring 88. Indirect fluid flow would still occur between the turbine and the impeller if fluid were allowed to escape from the working chamber 102 through the annular gap 144 between the outer periphery of sleeve portion 42a and the adjacent annular surface on member 44; this escaping fluid would create a fluid movement through impeller member 38 which would establish a suction at gap portion 110a which would in turn draw fluid through makeup passage 126 and through an annular gap 146 between the inner periphery of sleeve portion 42a and the adjacent annular edge of turbine member portion 90c. This indirect fluid flow is prevented by split ring seal 118 which coacts with the outer periphery of sleeve portion 42a to seal gap 144.

The invention device will thus be seen to provide a hydrokinetic coupling which retains the superior energy transmitting characteristics of the conventional axially facing trough design and additionally provides torque regulating characteristics superior to the conventional axially facing design.

We claim:
1. A hydrokinetic torque transfer device comprising:
A. a first member defining an annular, radially inwardly opening trough;
B. a second member defining an annular, radially outwardly opening trough disposed concentrically within and in confronting relation to said inwardly opening trough to define therewith a toroidal fluid working chamber;
C. means mounting said members for relative rotation about the common axis of said troughs;
D. a first set of fluid directing blades positioned at circumferentially spaced locations around said inwardly opening trough and presenting a stepped edge within said chamber; and
E. a second set of fluid directing blades positioned at circumferentially spaced locations around said outwardly opening trough and presenting a stepped edge spaced from and complementary to the stepped edge on said first set of blades to define therebetween an annular stepped gap.

2. The device of claim 1, wherein a first portion of said stepped gap is defined by mutually facing portions of said stepped edges which are substantially parallel to said axis and a second portion of said stepped gap is defined by mutually facing portions of said stepped edges which are transverse to said axis.

3. The device of claim 2, wherein said stepped gap has a third portion defined by mutually facing portions of said stepped edges which are substantially parallel to said axis and offset from said parallel edge portions defining said first gap portion by said second gap portion.

4. The device of claim 1, wherein one portion of said stepped gap is defined by mutually facing portions of said stepped edges which are substantially parallel to said axis, another portion of said stepped gap is defined by mutually facing portions of said stepped edges which are substantially parallel to said axis and offset from said parallel edges defining said one gap portion by a core guide ring disposed in the approximate volumetric center of said toroidal fluid working circuit and fixed to one of said blade sets.

5. The device of claim 2, and further including a core guide ring disposed in said second gap portion and fixed to said transverse edge portions of said first or second blade sets.

6. The device of claim 5, wherein said first member is operatively connected to a prime mover and said second member is connected to a load and driven in response to rotation of said first member.

7. The device of claim 5, including a cylindrical sleeve concentric to said axis and axially movable into and out of said first gap portion for controlling toroidal fluid circulation of fluid between said first and second blade sets.

8. The device of claim 7, wherein said core guide ring is disposed to cooperate with an end of said sleeve to form a seal to shut off fluid circulation between said first and second blade sets.

9. The device of claim 8, including means for biasing said sleeve into sealing cooperation with said core guide ring.

10. The device of claim 9, wherein said device further includes a control shaft coaxial with and mounted for sliding movement along said axis and wherein said sleeve is connected to said shaft to facilitate withdrawal of said sleeve from said gap.

11. The device of claim 1 wherein:
A. said circumferentially spaced blades in said first and second blade sets are disposed in said troughs in a substantially radial manner with respect to said axis;
B. said stepped edge of each of said blades in said first and second blade sets includes a first and a second edge portion parallel to said axis and a third edge portion transverse to and joining said parallel edge portions; and
C. each of said blades in said first and second blade sets further including a first and a second radially extending blade portion, each of said first and second radially extending blade portions beginning at said first and second parallel edge portions respectively and each forming a 45° angle with a radius drawn from said axis to said respective parallel edge portion.

12. The device of claim 11 wherein each of said blades in said first and second blade sets each include a curved blade portion joining said first and second radially extending blade portions.

13. A hydrokinetic torque transfer device comprising:
   A. a first member defining an annular, radially inwardly opening trough concentric to an axis;
   B. a second member defining an annular, radially outwardly opening trough disposed concentrically within and in confronting relation to said inwardly opening trough to define therewith a toroidal fluid working chamber;
   C. means mounting said members for relative rotation about said axis;
   D. first and second sets of fluid directing blades circumferentially disposed respectively in said inwardly and outwardly opening troughs in a manner defining an annular stepped gap between mutually facing edges of said first and second blade sets, said stepped gap having a first gap portion parallel to said axis and a second gap portion transverse to said axis;
   E. a core guide ring disposed in said transverse gap portion, and fixed to one of said blade sets; and
   F. a cylindrical control sleeve slidable into and out of said first parallel gap portion and having an end cooperable with said guide ring to form a seal for blocking fluid circulation between said first and second blade sets.

14. The device of claim 13 wherein said stepped gap includes a second gap portion parallel to said first gap portion and joined to said first gap portion by said transverse gap portion.

15. A hydrokinetic torque transfer device comprising:
   A. a first member defining an annular, radially inwardly opening trough;
   B. a second member defining an annular, radially outwardly opening trough disposed concentrically within and in confronting relation to said inwardly opening trough to define therewith a toroidal fluid working chamber;
   C. means mounting said members for relative rotation about the axis common to said troughs;
   D. a first set of fluid directing blades positioned at circumferentially spaced locations around said inwardly opening trough, each of said blades in said first blade set presenting a stepped edge within said chamber;
   E. a second set of fluid directing blades positioned at circumferentially spaced locations around said outwardly opening trough, each of said blades in said second blade set presenting a stepped edge within said chamber, said stepped edges of said first and second sets of blades being spaced from and complementary to one another to define therebetween an annular stepped gap having two gap portions parallel to said axis and interconnected by a third gap portion transverse to said axis;
   F. a core guide ring located in said transverse gap portion and fixed to one of said blade sets; and
   G. a cylindrical sleeve concentric to said axis and axially movable into and out of one of said parallel gap portions, said sleeve adaptive to cooperate with said core guide ring to form a seal for blocking fluid circulation between said first and second blade sets.

16. The device of claim 15 wherein said first member is mounted for rotation and driven by a prime mover.

17. The device of claim 16 wherein fluid is located in said working chamber; and said second member is mounted for rotation and connected to drive a load in response to a fluid flow caused by rotation of said first member.

18. A hydrokinetic torque transfer device comprising:
   A. a first member defining an annular, radially inwardly opening trough concentric to an axis, said trough having one side surface extending radially inwardly further than the other side surface;
   B. a second member defining an annular, radially outwardly opening trough disposed concentrically within and in confronting relation to said inwardly opening trough, said outwardly opening trough having one side surface extending radially outwardly further than the other side surface, said further outwardly extending surface extending outwardly an amount substantially equal to and on the side opposite said further inwardly extending surface of said inwardly opening trough, said inwardly and outwardly opening troughs together defining a toroidal fluid working chamber;
   C. fluid in said working chamber;
   D. means mounting said members for relative rotation about said axis to circulate said fluid in said working chamber;
   E. a first set of fluid directing blades circumferentially spaced in said inwardly opening trough and each blade having
      1. a curved edge conforming to the surface of said inwardly opening trough, and
      2. a stepped edge facing said outwardly opening trough;
   F. a second set of fluid directing blades circumferentially spaced in said outwardly opening trough and each blade having
      1. a curved edge conforming to the surface of said outwardly extending trough, and
      2. a stepped edge spaced from and complementary to the stepped edges on said first set of blades to define therebetween an annular stepped gap, said stepped gap including two gap portions parallel to said axis and offset by a third gap portion transverse to said parallel portions;
   G. a core guide ring disposed in said transverse gap portion and fixed to said stepped edge portion of one of said blade sets defining a side of said transverse gap portion; and
   H. a cylindrical control sleeve movable into and out of one of said parallel gap portions for controlling toroidal fluid circulation between said first and second blade sets.

* * * * *